US007676675B2

(12) United States Patent
Billharz et al.

(10) Patent No.: US 7,676,675 B2
(45) Date of Patent: Mar. 9, 2010

(54) ARCHITECTURE FOR CONNECTING A REMOTE CLIENT TO A LOCAL CLIENT DESKTOP

(75) Inventors: Alan M. Billharz, Seattle, WA (US); Aaron J. Nonis, Duvall, WA (US); Scott Darnell, Redmond, WA (US); Neil S. Fishman, Bothell, WA (US); Tracy M. Daugherty, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1089 days.

(21) Appl. No.: 10/456,235

(22) Filed: Jun. 6, 2003

(65) Prior Publication Data

US 2004/0250130 A1    Dec. 9, 2004

(51) Int. Cl.
  *H04L 9/32*    (2006.01)
(52) U.S. Cl. .................................. 713/168
(58) Field of Classification Search ............ 726/15, 726/8
  See application file for complete search history.

(56) References Cited

U.S. PATENT DOCUMENTS

| | | | |
|---|---|---|---|
| 5,826,029 A | 10/1998 | Gore, Jr. et al. | |
| 5,864,666 A | 1/1999 | Shrader | |
| 5,944,823 A | 8/1999 | Jade et al. | |
| 6,029,201 A | 2/2000 | Neill | |
| 6,081,900 A | 6/2000 | Subramaniam et al. | |
| 6,104,716 A | 8/2000 | Crichton et al. | |
| 6,209,036 B1 * | 3/2001 | Aldred et al. ............... | 709/229 |
| 6,219,706 B1 * | 4/2001 | Fan et al. .................... | 709/225 |
| 6,233,541 B1 * | 5/2001 | Butts et al. ................... | 703/27 |
| 6,243,751 B1 * | 6/2001 | Chatterjee et al. ........... | 709/226 |
| 6,292,904 B1 | 9/2001 | Broomhall et al. | |
| 6,304,908 B1 * | 10/2001 | Kalajan ....................... | 709/229 |
| 6,519,636 B2 | 2/2003 | Engel et al. | |
| 6,665,642 B2 * | 12/2003 | Kanevsky et al. ........... | 704/260 |
| 6,718,388 B1 * | 4/2004 | Yarborough et al. ........ | 709/227 |
| 6,751,677 B1 * | 6/2004 | Ilnicki et al. ................ | 719/316 |
| 6,879,593 B1 * | 4/2005 | Kunze et al. ................ | 370/401 |
| 2001/0047406 A1 * | 11/2001 | Araujo et al. ............... | 709/223 |
| 2002/0162024 A1 | 10/2002 | Cunchon et al. | |
| 2003/0046586 A1 * | 3/2003 | Bheemarasetti et al. ..... | 713/201 |
| 2003/0079146 A1 | 4/2003 | Burstein | |
| 2004/0128545 A1 * | 7/2004 | Chakravarty ................ | 713/201 |

FOREIGN PATENT DOCUMENTS

WO    WO 00/070839    11/2000

OTHER PUBLICATIONS

Alcatel, "Authenticated VLANs: Secure Network Access at Layer 2", Nov. 2002, pp. 1-14.*
European Search Report, Ref. No. EP31096TE900kap, Patent No. 04102297.1-2413, Dated Oct. 5, 2004.

* cited by examiner

*Primary Examiner*—Emmanuel L Moise
*Assistant Examiner*—Jeffrey D Popham
(74) *Attorney, Agent, or Firm*—Workman Nydegger

(57) ABSTRACT

Architecture for generating and maintaining a terminal services connection from an external client to an internal intranet client behind a firewall and/or router. The external user is first authenticated after which the external client is passed to a remote user portal. A listing of available internal computers is presented to the external client user, the selection of one that initiates an intranet server to create a listening socket thereon, and a socket on the selected internal client. The server creates a thread that manages the terminal services connection between the external client and the internal client by listening for traffic and forwarding the traffic between the ports.

44 Claims, 13 Drawing Sheets

FIG. 5

Welcome - Remote User Portal

File  Edit  View  Sign Out  Help & Settings

Home | Favorites | Search | Mail & More | Messenger | Entertainment | Money | People Welcome to the Remote User Portal. Enter your username and password.

USERNAME

PASSWORD

LOGON

HELP
You can learn more about the login process.

ERROR: login failed, please try again. Ensure that your username and password is correct.

Done                                                                 Time

Welcome - Remote User Portal

File   Edit   View   Sign Out   Help & Settings

[Home]  [Favorites]  [Search]  [Mail & More]  [Messenger]  [Entertainment]  [Money]  [People]

Address: http://www.address.com

[LOG OFF]

Welcome. Using the links below, you can access components of the internal network from the Internet. To ensure security, Log Off when finished using Remote User Portal.

- CONNECT TO SERVER DESKTOPS
  Access server desktops within the network.
- CONNECT TO CLIENT DESKTOPS
  Access client desktops within the network.
- MONITOR HELP DESK
  View a current list of issues for the network.
- ADMINISTER INTERNAL COMPANY WEB SITE
  Edit, modify, and maintain the site.
- VIEW A PERFORMANCE REPORT FOR THE INTERNAL SERVER
  View the most recent list of critical alerts, event log messages, and performance counters.
- VIEW A USAGE REPORT FOR THE INTERNAL SERVER
  View how server resources are being used.

ADDITIONAL LINKS
- E-mail Access
- Download Manager
- View Client Help

Done                                                            Time

FIG. 8

ARCHITECTURE FOR CONNECTING A REMOTE CLIENT TO A LOCAL CLIENT DESKTOP

TECHNICAL FIELD

This invention is related to remotely accessing a computer, and more specifically, to remotely access a client computer through a firewall and/or router.

BACKGROUND OF THE INVENTION

The advent of a global communication network, e.g., the Internet, has facilitated connectivity to a wide variety of devices from most anywhere in the world. Initially, these communication devices included what is now considered to be rudimentary one-way signaling, for example, to a pager. However, portable devices are now much more sophisticated facilitating bi-directional communication not only in textual content, but with voice and image content as well. Storage and memory capabilities in such smaller mobile devices are increasing, further facilitating the exchange of full content information from almost anywhere. Thus users need not carry all of the information with them, but simply connect remotely to a home station to access the information desired. With the increasing mobility of employees and the need to access vast amounts of information, this capability provides the remote user with ready access to information to better serve the employer and customers.

However, presently, there is no mechanism for Internet users to facilitates a remote desktop connection, e.g., a terminal services connection, to access a client computer within an intranet network, behind a firewall and/or router, without first requiring virtual private network (VPN) rights or a statically configured path through the router and firewall. Connecting to the network via VPN and then using terminal services to access a client is complicated and awkward. Moreover, maintaining a static route from the Internet to an internal client is a security risk.

What is needed is a tool that enables remote desktop connections to be made from outside an intranet firewall and/or router to a client computer behind the firewall and/or router, sidestepping both negative aspects of VPN connectivity and security vulnerabilities.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture of allowing an external user to use remote desktop solutions to remotely connect to an internal client desktop behind a firewall and/or router via a network-enabled computer. In the context of a terminal services connection, this is accomplished by forwarding terminal services data messages to and from the external client via an internal intranet server to an internal client computer on the intranet, thereby allowing a terminal services session through a firewall and/or router.

The external client connects to the internal client by first accessing a portal website, which is a dynamically created website that provides a single, simple, and consolidated entry point for remote users to access intranet features. Connectivity is initiated when the external user logs on to a central portal website and is authenticated to the internal computer. The website empowers remote users by providing a single access point from which all relevant features of the intranet, such as e-mail access and the user's client desktop, can be accessed from outside the network firewall and/or router.

The invention works by creating port sockets on the internal computer and the internal server. The internal server transmits the server port information to the external computer, which computer extracts the server port information and transmits to that port. The server creates a thread to manage the transparent transfer of data messages between the external and internal client computers, by forwarding traffic between the internal computer and the server port. The data packets contain the information necessary to maintain the terminal services connection. In essence, the intranet server is enabled to act as an intermediary in the terminal services session.

As indicated above, the invention is not limited to a terminal services connection, but includes any remote desktop solution that facilitates connection through the router and/or firewall from an external client or an intranet client, for example, X Windows.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 5 illustrates a sample Logon page that may be used with the remote user portal and internal network access.

FIG. 6 illustrates a sample Knowledge worker page for the remote user portal.

FIG. 8 illustrates a sample administrator web page for the remote user portal.

DETAILED DESCRIPTION OF THE INVENTION

Figure 1:
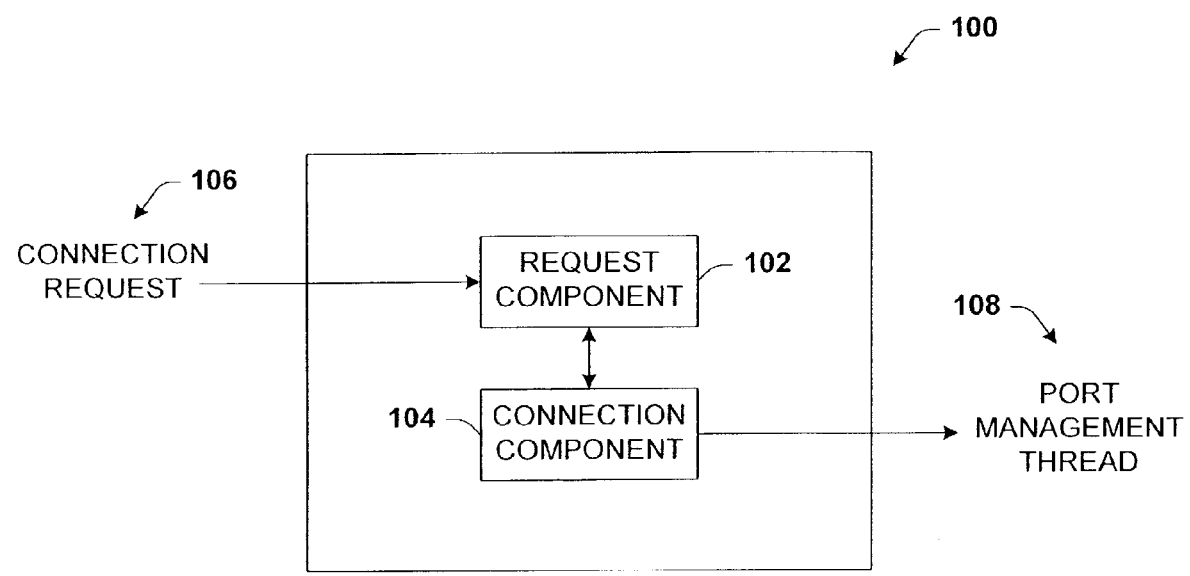
FIG. 1 illustrates a block diagram of the terminal services system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a block diagram of the terminal services system 100 of the present invention. The following description is provided in the context of a terminal services connection. However, the disclosed architecture is applicable to any remote desktop solution including, for example, X Windows®. The system 100 includes a request component 102 and a connection component 104. The request component 102 receives a connection request 106 in the form of a TCP/IP-based signal, e.g., an FTP (File Transfer Protocol) signal. The connection request may be received directly from the portable client device or from an intermediary device that forwards the request to the request component 102 via a wired or wireless communication link. Once received, the request component 102 signals the connection component 104 to initiate connectivity to the internal network through a firewall and/or router using terminal services. Hereinafter, it is to be understood that the use of the term "firewall" also is meant to be a router, or the combination of the router and the firewall. Ultimately, the output of the connection component 104 is a port management thread 108 that manages the terminal services connection through the firewall between the internal computer and the external computer. Note that the term computer in this context includes any device portable or not portable that can communicate over a network. Such devices include a desktop computer, server, portable notebook or laptop computer, network-capable mobile devices such as cell phones, personal data assistants, and the like.

Figure 2:
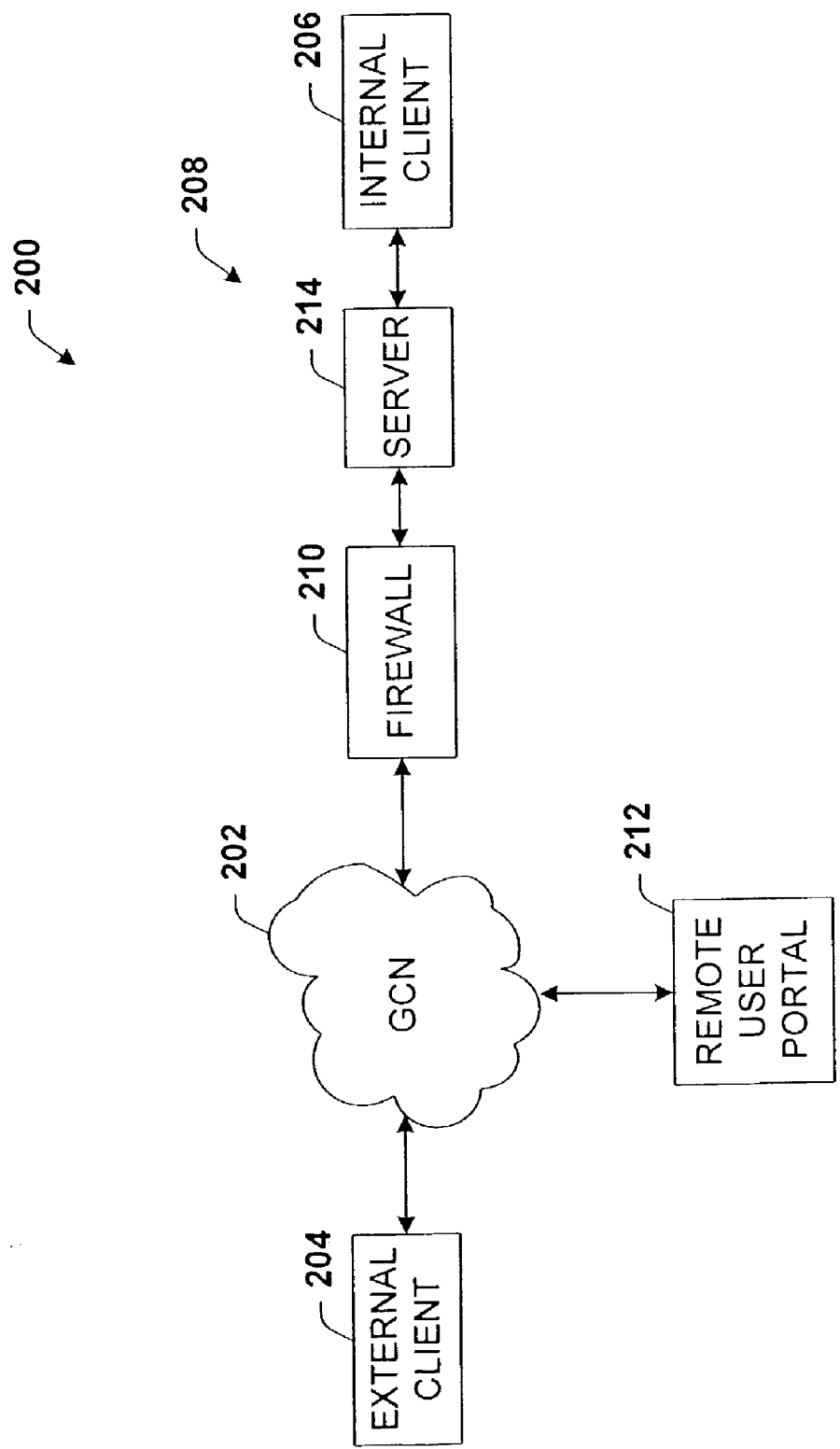
FIG. 2 illustrates network block diagram of a system of the present invention.

Referring now to FIG. 2, there is illustrated network block diagram of a system 200 of the present invention. This particular embodiment uses as a network, a global communication network (GCN) 202 over which all communications are made. However, it is to be appreciated that the network 202 may be a LAN, WAN, WWAN, or enterprise network over which an external and internal client may communicate. An external client 204 connects to the network 202 using wired or wireless services, which is conventional for network connectivity. The external client 204 wishes to access an internal client 206 of an internal network 208 (e.g., an intranet) behind a firewall 210.

A remote user portal (RUP) website 212 disposed on the GCN 202 serves as an access portal into the internal network 208. The external client 204 enters the URL (universal resource locator) address of the internal server 214 into the client browser, the server 214 denoted as internal only in that it is behind the firewall 210 and facilitates access to the internal network. The RUP 212 presents a login page, and the user of the external client 204 logs in. The server 214 presents a web page to the external client 204 offering information and hyperlinks to further information and options. One of the links is to the RUP server 212 through which internal client access is granted. The external client 204 then selects a remote access option, in response to which the external client 204 is rerouted for connection to the RUP 212 site for further processing. The user action of selecting the RUP remote access option or logging in to the RUP site may trigger the internal server 214 to then generate a list of the available internal clients and/or servers. The user selects a computer, and then a terminal services session is then invoked. Alternatively, the RUP 212 may signal the internal server 214 that a terminal services connection request has been received, in response to which the internal server 214 generates a list of all available clients of the internal network.

The RUP 212 may provide direct access to the internal server 214 through the firewall 210, since the firewall 210 is configured to allow preliminary and authenticated access by the RUP 212. The list of available internal clients is then transmitted from the internal server 214 to the RUP 212 for presentation to the external client 204. The external client user then selects the internal client 206 for connection. The internal server 214 creates a listening socket on both the server 214 and the internal client 206, and a management thread to manage the terminal services connection between the two sockets. The server port number is then passed to the external client 204. The external client 204 then initiates traffic to the internal client 206, and the management thread listens for traffic from both clients (204 and 206), forwarding the traffic between the two clients (204 and 206) transparently to the user. The user of the external client 204 then has direct access to the desktop of the internal client 206. This means that if the user has a particular application (e.g., an accounting application) installed only on the internal client 206, but not the external client 204, the user may launch this application for use from the external client 204 without installing the application on the remote client 204.

Note that the RUP 212 need not be a nodal entity separate from the internal server 214, but may reside on the server 214 and/or be an integral part of the server 214.

Application of the novel system includes the following example. Joe, in the wee hours of the morning, has an accounting epiphany that could save the company thousands of dollars. Joe needs to immediate access the company business server network quickly and easily from home. In accordance with the present invention, there are no numbers, complex sequences, or intricate logon procedures to remember.

Joe simply starts up the browser on his laptop, which automatically connects him through dialup to the Internet. Since he is outside of the company's local network, his home page automatically redirects him to the RUP website. Joe does not need to spend time considering how he is going to connect to his company. From the RUP site, he is instantly connected to a rich set of business services.

First, he uses the RUP to invoke terminal services directly to the company's spreadsheets, which are shared on a single terminal services machine in application sharing mode. That is, Joe does not need to first load the spreadsheet application on his home machine in order to access the spreadsheets at the office. He actually runs the application from the desktop of his office computer, and accesses the data via his office computer, data that is stored on his office computer and/or the data of a database accessible over the office network. He confirms that his accounting strategy works, and then uses terminal services again to connect to his personal computer inside the company. From there he edits the company strategy document that he always keeps handy on his desktop. Finally, he uses e-mail access to his personal company account to send out a self-congratulatory e-mail to all of his coworkers, and then signs out of the system.

Another example highlights the capabilities of the present invention when accessing the internal network from an Internet kiosk. A user at an airport uses an Internet kiosk and accesses the website portal through which internal access is obtained. After entering the same credentials used to access her own machine, she is presented a simple menu web page for accessing a number of options, including her e-mail account. She sends e-mails and then explores other options, including accessing shared services on the network to view company announcements that she missed while she traveling. She then logs out when the allotted time is up.

Still another example of the capabilities of the present invention involves remote VAP (value added provider) services. An internal networked client machine having problems can now be accessed directly and quickly by the VAP to fix the problem. The VAP uses the RUP website to connect directly to the client machine through a remote desktop feature. The VAP technician easily corrects the problem without ever leaving his or her seat.

Figure 3:
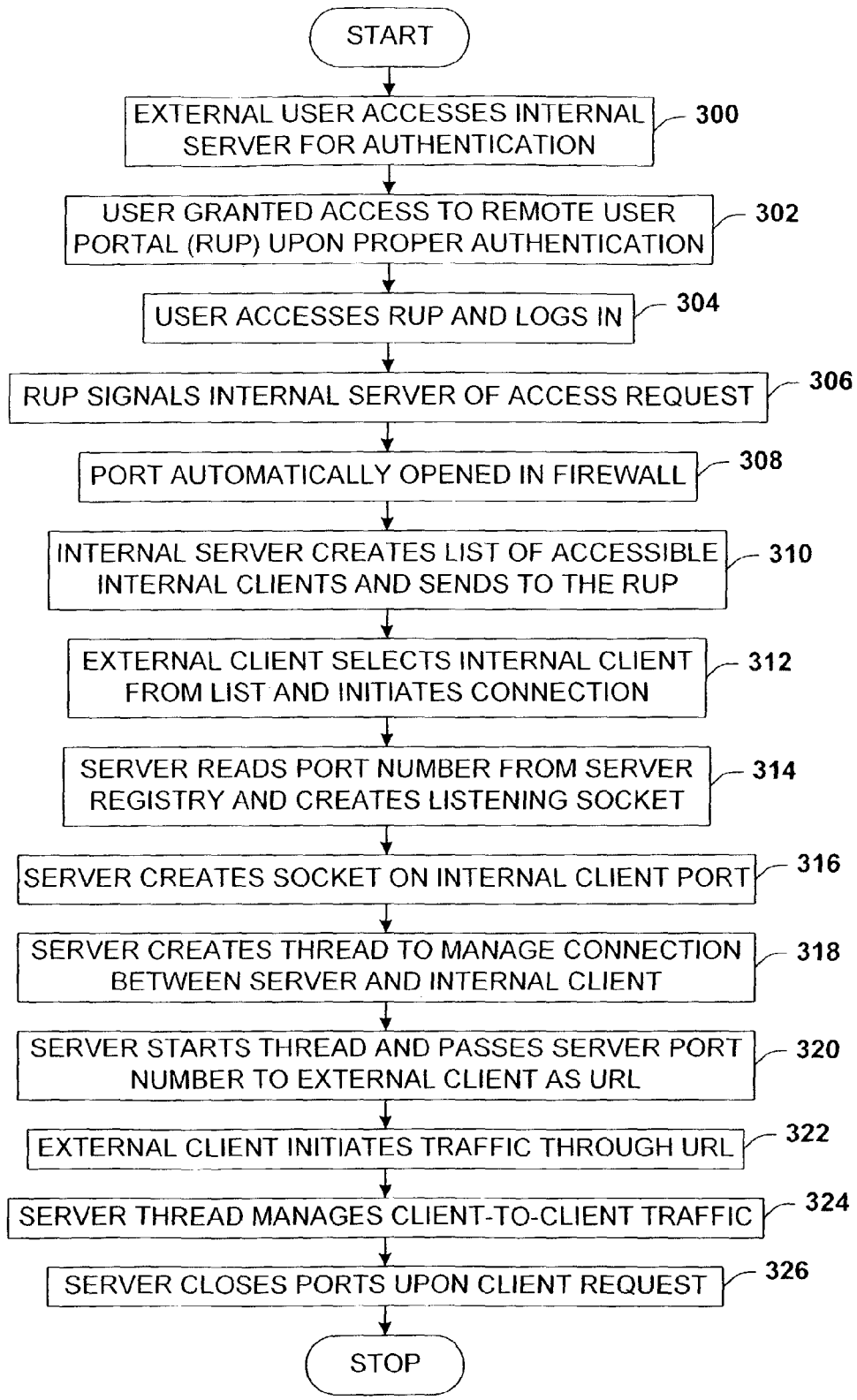
FIG. 3 illustrates a flow chart of the communication process of the present invention.

Referring now to FIG. 3 there is illustrated a flow chart of the communication process of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 300, the external user access the internal sever for authentication. At 302, the user is granted access to the RUP site upon proper authentication. At 304, the external client accesses the RUP. This may occur automatically by the user simply using the URL address for the internal server, selecting a remote user option, which automatically routes the connection request to the RUP, or the user inserting the URL of the RUP into the client browser. In response, the RUP presents a web page to the user. The client user navigates the web page, and where necessary, may be prompted to download the terminal services component to facilitate capabilities of the present invention. The user may also be required to log in for proper authentication before further access is allowed. At 306, the RUP communicates to the internal server (e.g., a business server) that a connection request has been received. At 308, a communication port is opened in the firewall at setup time. Note that the firewall may be a hardware or software firewall. In response to receiving the connection request from the RUP, the server generates a list of available internal clients and returns the list to the RUP for presentation to the user, as indicated at 310. The list includes only those clients suitably configured for access according to the present invention. Thus there may be some operational internal clients not on the list transmitted to the RUP, since they may not include a suitable operating system or remote access capabilities.

At 312, the user selects an internal client to access, and initiates the connection. At 314, the internal server reads a port number value from its registry (e.g., a default 4125), and creates a listening socket on that port. The same port is already opened in the firewall. Thus, at this point, a communication conduit exists from the RUP through the firewall and to the internal server. At 316, the server creates a socket on the internal client, e.g., client port 3389, and which is designated for terminal services connections. At 318, the server creates a thread to manage the terminal services connection between the server and client sockets. At 320, the server starts the thread, and the port value for the server is passed back to the external client in the form of a URL. At 322, the port value is extracted from the URL, and the terminal services of the external client use the port value to direct traffic thereto. At 324, the server management thread listens to the ports for traffic, and forwards incoming messages from one port to there other transparently to the user. At 326, when the external client log out, the server thread closes the ports. The process then reaches a Stop block.

Note that it is to be appreciated that multiple ports may be opened to the Internet. For example, a port 4125 may be mapped to port 3389 of a first internal client, a port 4126 may be mapped to a port 3389 of a second internal client, and so on. However, this is less secure because now, more ports are open, and the connections to the desktops may always be open.

In accordance with the present invention, there is a single external port opened to which is mapped one or more internal ports to internal clients.

Figure 4:
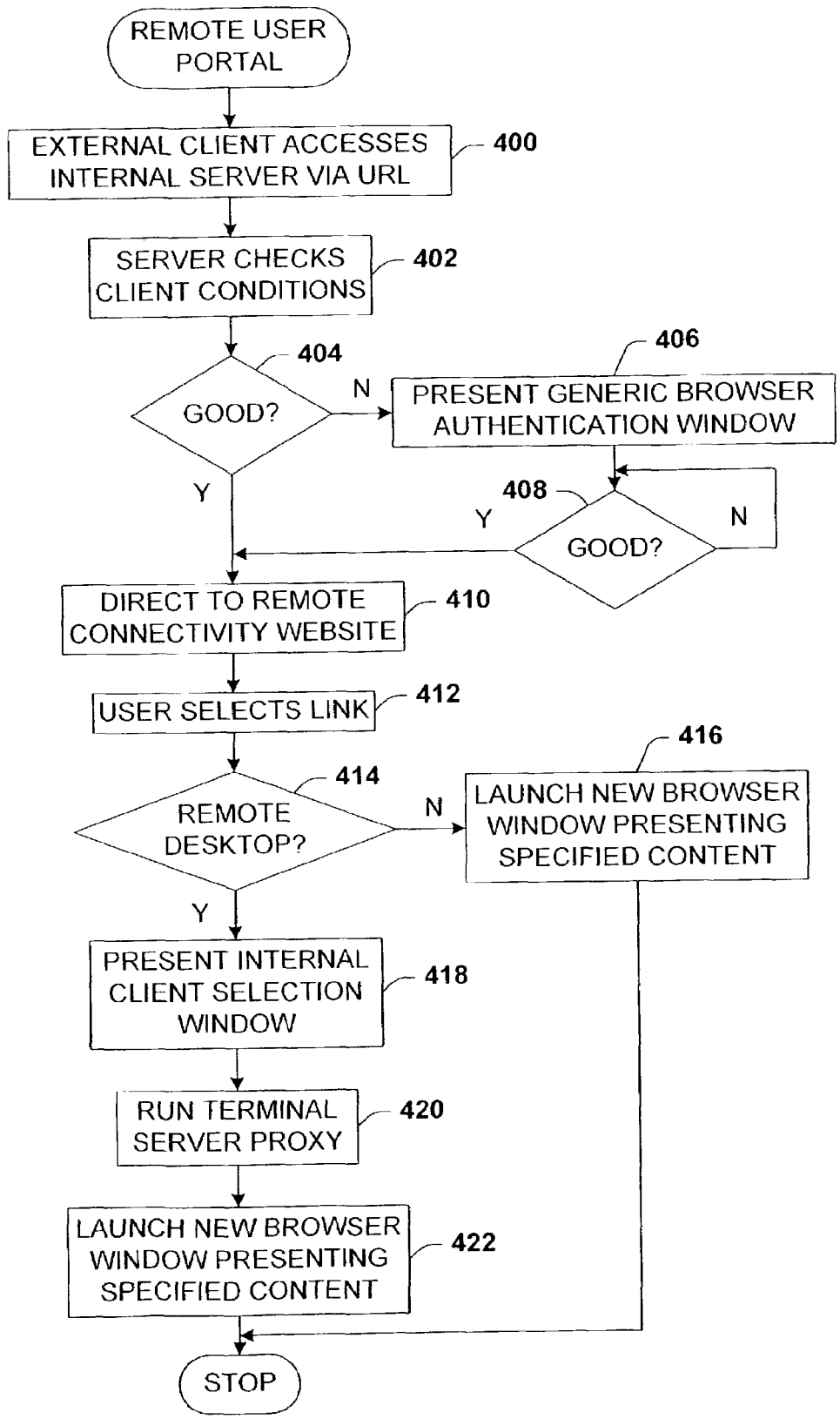
FIG. 4 illustrates a flow chart of the authentication process for the external client user.

Referring now to FIG. 4, there is illustrated a flow chart of the authentication process for the external client user. Upon requesting access to the web site in the client browser, the user must first be authenticated into the RUP. The internal server logon credentials are what is required for user authentication. In all cases, an authentication logon screen is presented, and the user cannot enter the RUP site until the login is performed properly. The user must be a member of the remote user portal users security group or the domain administrators security group in order to access the web site. All anonymous access to any web page of the web site, besides the logon screen is denied. A guest account cannot access the RUP site.

At 400, the external client enters the URL of the internal server into the client browser and connects thereto. If the user selects the RUP option, the user is directed automatically to the RUP website for login and authentication processes. The RUP acts as a proxy for such processes to the internal server. At 402, the RUP processes queries from the server that check to ensure that the external client is suitably configured to perform the connection operations of the present invention. This includes, but is not limited to, ensuring that the client operating system is sufficiently updated to run remote operations, and that the correct client credentials are used and cached for intercommunication. At 404, a determination is made as to if the client conditions are good. If NO, flow is to 406 where an authentication window, e.g., a forms-based window, is presented to the user. The user will then be prompted to complete the prerequisites for connectivity of the system. At 408, the system continues to perform a check to determine if the client has fulfilled the prerequisites. If NO, the system loops back to the input of 408 to continue checking the client. At this point, a timeout feature may be used to ensure that the system is not locked in a loop. Additionally, the system may implement a finite number of login attempts before a message is presented to the user to use alternative methods or to correct certain aspects of the required perquisites. If the conditions are finally met, and client authentication is approved, flow is from 408 to 410 redirect the user back to the RUP website for access to the internal client. At 404, if the conditions of the client are correct, e.g., the credentials are correct, cached, and the request is external to the internal network, flow is directly to 410 to continue the processes at the RUP website.

At 412, the client users makes a client selection on the website web page, to select whether or not to remotely link to the internal client machine, which selection is hyperlinked to another screen. At 414, the system determines if the user desires content other than that which links him or her to the remote client. If NO, flow is to 416, where a window is opened to make a selection to the desired content. Flow then reaches a Stop block. Note that content is opened in the bottom frame of the same browser window, that is, no new browser windows are opened. Alternatively, if the user chooses to connect remotely to the internal client, flow is from 414 to 418 to present to the user a web page that lists all available internal clients or servers. At 420, when the internal client or servers is selected, terminal services are run in proxy from the external client to the internal client. At 422, a window is opened in the same browser window presenting content according to the internal client. The process then reaches the Stop block.

Referring now to FIG. 5, there is illustrated a sample Logon page 500 that may be used for the Remote User Portal and/or the internal server logon process. The user will first be presented with a forms-based authentication log on page upon navigating to the Remote User Portal. This page requests from the user his or her username and password. The page does not request the domain name; during the authentication process, the internal server domain name is forwarded with the user's log on credentials. If a user fails to log on, a message appears above the username and password fields that indicate that the log on failed, and prompts the user to try again. The message may state, for example, "Logon failed. Ensure that your username is correct, and then type your password again." The username field retains the user's input, but the password field is blanked after a failed log on attempt. After a successful log in, the user is presented with a blank white page that has the text "Loading . . . " centered on it in the same font as the RUP links, until the page loads, e.g., the Administrator page. This progress page helps to calm users who may think that the site is not responding, especially since the browser may indicate, "Done" long before the page has completely loaded.

Figure 6:
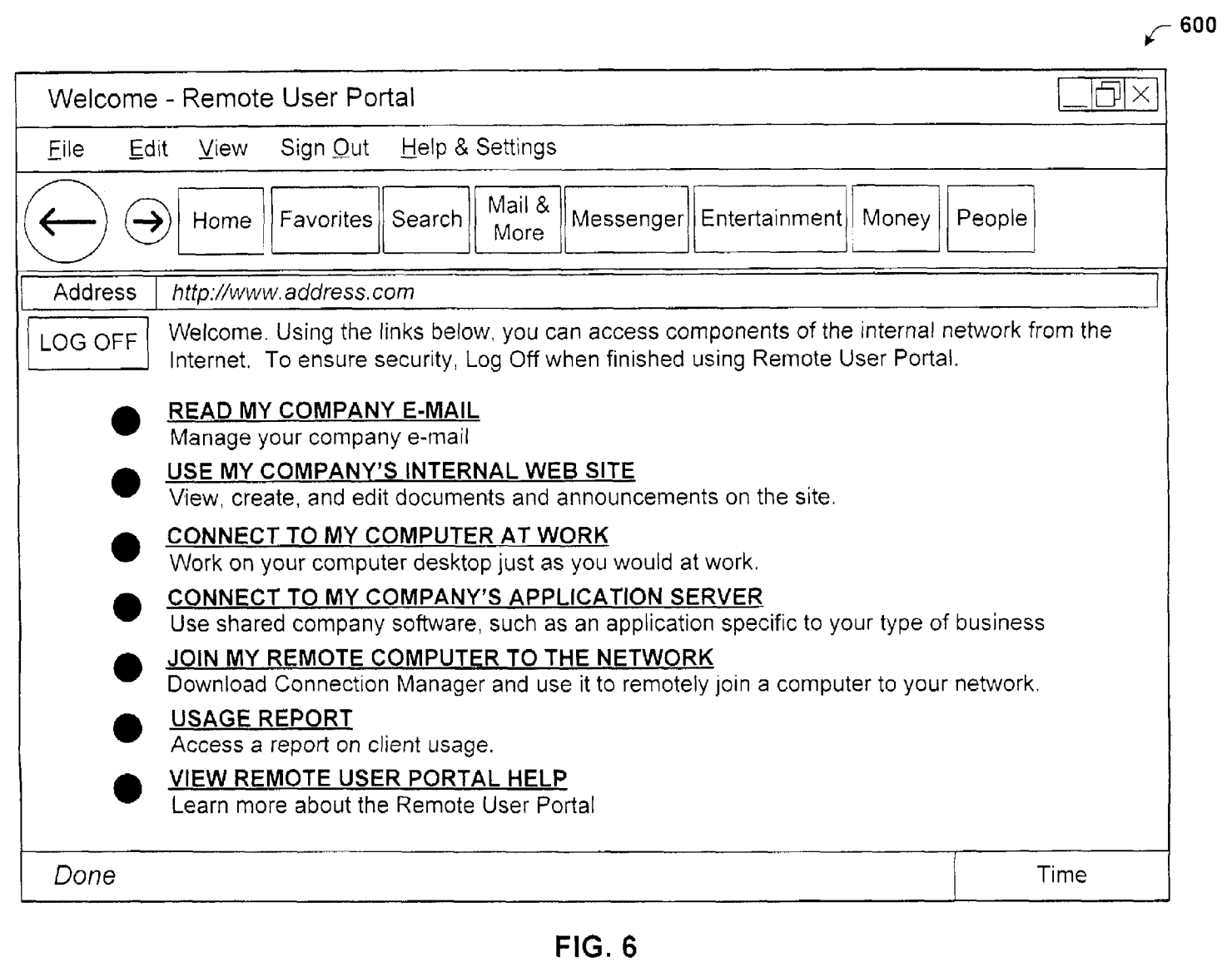

Referring now to FIG. 6, there is illustrated a sample Knowledge Worker page 600 for the Remote User Portal. If the user authenticates as a member of the Remote User Portal users security group, he or she is presented with the page 600. It contains a Welcome message, a Log Off link, and links to open e-mail, document and information collaboration services, Client Help, and Remote Desktops on the client machines and the second server (for shared applications). It also includes a link to download a Connection Manager and the monitoring web site. If any of these features are not installed during installation or not published to the Internet, the corresponding link is automatically not displayed. Additionally, the number of links made accessible to the user depends on the user that logs in. For example, if a non-administrative user logs in, non-administrative links are not shown, for example, a Server Desktop link, as illustrated FIG. 8. The title bar may include the date in a written format (for applicable languages) along with a "Log off" link.

The Welcome message includes the username in the form of "Welcome, %username%," and further, "Using the links below, you can access components of the internal network from the Internet. To ensure security, Log Off when finished using the Remote User Portal."

The links are displayed in the following order, and corresponding to e-mail, document and information collaboration services, remote desktop connect services, terminal services to server in application-sharing mode, connection manager, usage reporting, and user help. Note that the page 600 is simply an example, and may include additional links, text, and graphics or fewer links, text, and graphics at the discretion of the designer.

Figure 7:
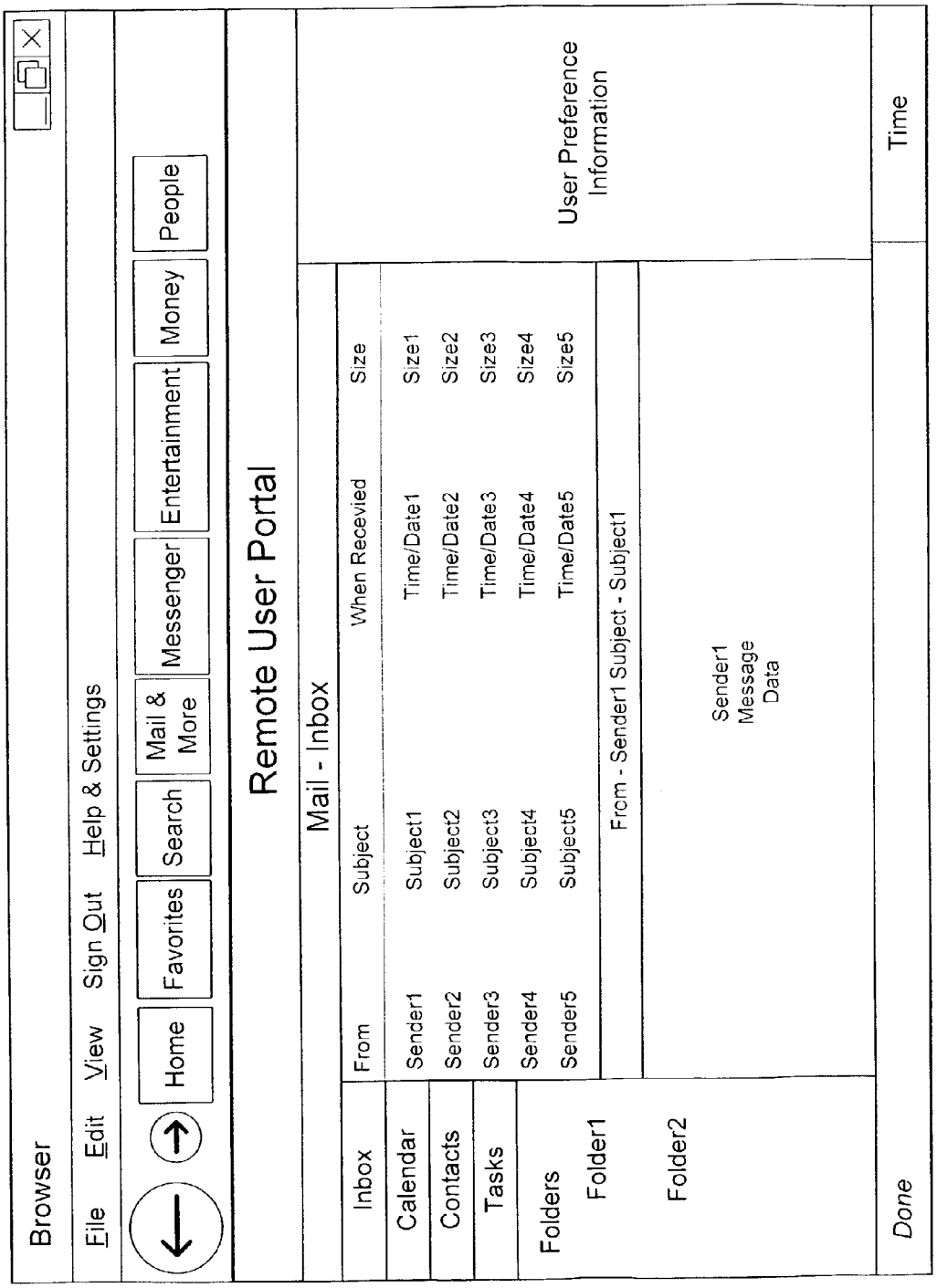
FIG. 7 illustrates a sample e-mail page for the remote user portal.

Referring now to FIG. 7, there is illustrated a sample e-mail page 700 for the Remote User Portal. The e-mail link will only be shown if e-mail access is installed and is published. The e-mail access page opens in the same browser window, with a RUP frame. This link reflects whether SSL is required for this site. The user's credentials are forwarded to the e-mail site. For illustrative purposes only, the page of FIG. 7 indicates the use of frames, as are understood by one skilled in the art of web page design.

The document and information collaboration services link (i.e., " . . . Internal Web Site") will only be shown if the corresponding application services are installed and published, and opens the site in the same browser window, with a RUP frame. This link reflects whether SSL is required for this site. If SSL is required for the Remote User Portal, SSL is also used for the application services site to eliminate a repeated log in.

The "Connect To My Computer . . . " link opens the computer selection page 900 of FIG. 9 that is populated with a list of all clients on the network that are running client operating systems compatible with the disclosed architecture. The computer selection page is rendered in the same window.

Once a computer is selected, a terminal services connection to the computer opens in the same browser window, except when "full-screen mode" is selected. The terminal services connection will close if the user selects the Main Menu or Log Off links. This link will only be displayed if there is at least one computer on the network that is running applications compatible with the disclosed architecture.

If there is a server on the network that is a terminal services server in application-sharing mode, and the user is a member of the terminal services Application Sharing Group, a link to terminal services is shown into the second server. The credentials are forwarded and the terminal services connection opened for the user, if the user has selected "connect as %username%." The functionality is the same as the terminal services to client feature mentioned hereinabove.

The "Join My Remote Computer . . . " link begins a download of a Connection Manager program to the client. This link is only shown if a Connection Manager package is available. When this link is selected, if the request is an external IP, the user will be presented with a warning OK-only popup that states: "After you install Connection Manager, ensure that all users of this computer have strong passwords to protect the security of your Small Business Server network."

If the user is a member of the Report Users group, and the Monitoring web site is published, a link to the usage report is shown. This link provides the business owner a way to remotely monitor how the server resources are being used.

The "... User Portal Help" link opens Client Help, pointing to the Remote Access chapter in the same browser window, with a RUP frame. If SSL is required for the Remote User Portal, SSL is also be used for the Client Help site to eliminate a repeated log in.

Referring now to FIG. 8, there is illustrated a sample administrator web page 900 for the Remote User Portal. The Administrator page is shown to all users that are members of a Domain Administrators security group. All possible links are shown to the Administrator from this page. The links are grouped into Administrative Tasks and Additional Links, to better differentiate what the administrator should be looking for. The title bar also includes the date in a written format (for applicable languages) along with a "Sign Out" link (not shown).

Using the following links, the administrator can access components of the internal network over the Internet.

The "Connect To Servers ..." link is shown on the Administrators page, unless the Administrator manually alters the registry to turn it off. It links to the computer selection page, only populated with a list of servers in the internal network, including the internal server itself. The internal server is selected from the list by default. The credentials are forwarded and terminal services connection opened for the user, if the user has selected "connect as %username%. The terminal services connection to an internal server opens in the same browser window, in a similar fashion to the terminal services-to-clients feature described hereinabove. This link is only available to Domain Administrators.

The " ... Help Desk" link launches the document and information collaboration services help desk in the same browser window, with a RUP frame, so that the administrator can examine the issues on the network. This link reflects whether SSL is required for this site. This link is only available to Domain Administrators, and is not shown if collaboration services is not installed or published. This determination is made by looking for the corresponding registry keys, as can be done by any of the aforementioned links and services. If SSL is required for the Remote User Portal, SSL will also be used for the collaboration services site to eliminate a repeated log in.

The "Administer Internal Company ..." link allows the administrator to edit, modify, and maintain the company's internal Web site, and launches the collaboration services administration page in the same browser window, with a RUP frame, so that the administrator can make changes to the company intranet site. This link reflects whether SSL is required for this site. User credentials are forwarded to the collaboration services site, and is only available to Domain Administrators. This link is not shown if the collaboration services application is not installed or is not published. This can be determined by looking for the corresponding registry key. If SSL is required for the Remote User Portal, SSL will also be used for the collaboration services site to eliminate a repeated log in.

The "... Performance Report ..." link allows the administrator to view the latest performance server status report in the same browser window, with a RUP frame. This link is only available to Domain Administrators. User credentials are forwarded to the Monitoring folder. The link is shown only if the file exists. If SSL is required for the Remote User Portal, SSL will also be used for the Monitoring site to eliminate a repeated log in.

The "... Usage Report ..." link allows the administrator to view the latest usage server status report in the same browser window, with a RUP frame. This link is only available to Domain Administrators. User credentials are forwarded to the Monitoring folder. The link is shown only if the file exists. If SSL is required for the Remote User Portal, SSL will also be used for the Monitoring site to eliminate a repeated log in.

The administrator page 800 also includes the Additional Links of e-mail access, download manger, and view client help.

Figure 9:
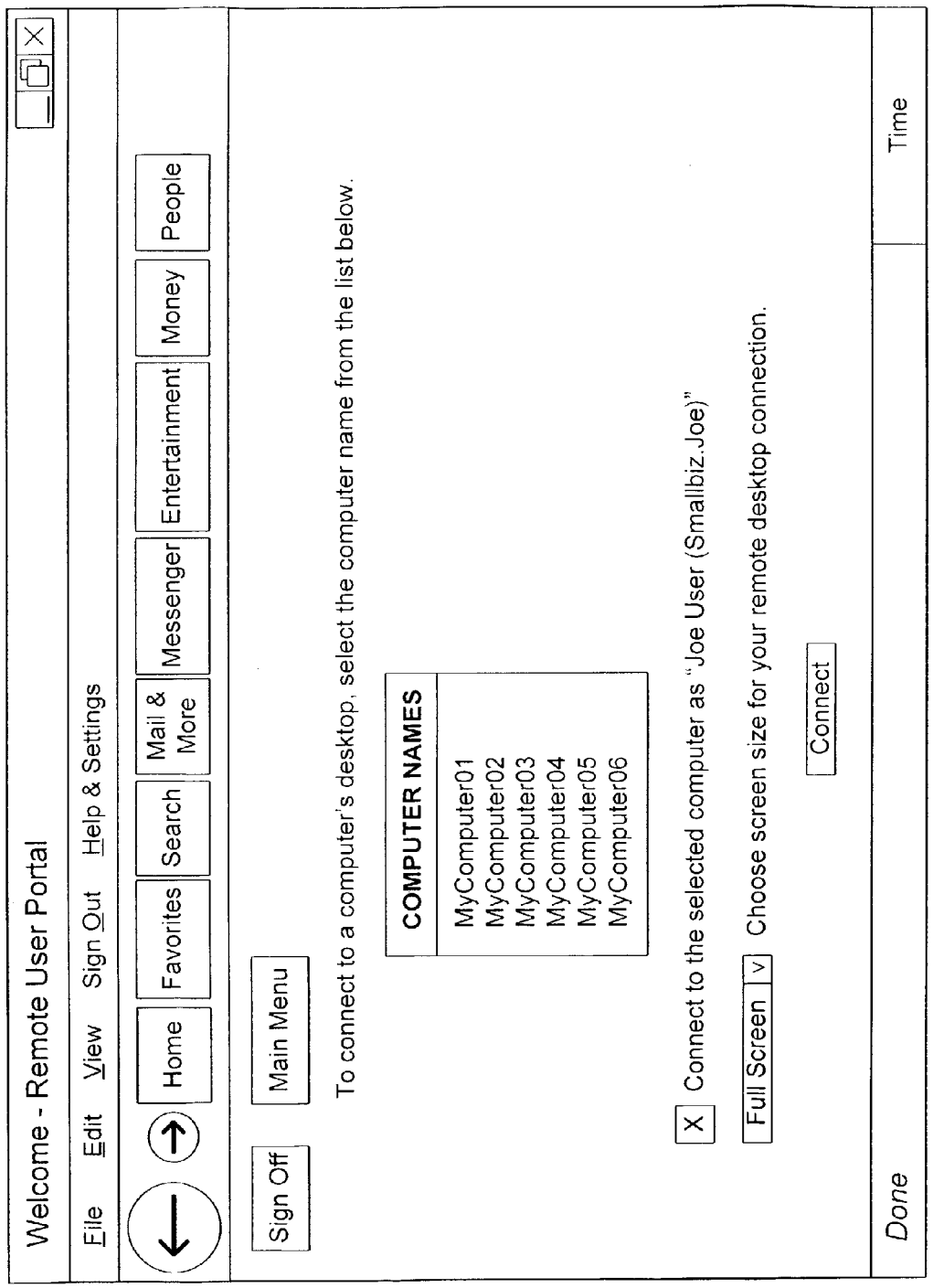
FIG. 9 illustrates an example of a computer selection web page.

Referring now to FIG. 9, there is illustrated a computer selection web page 900. After the user selects to connect to a computer via Remote Desktop, he or she is presented with the computer selection page 900 in the same browser window, with a RUP frame. Depending upon the link selected, the list on this page will contain a different set of computers. That is, client desktops, user's own computer, server desktops, and company shared application services. Note that these clients may or may not have the Remote Desktop application enabled. To determine this, a remote registry call is made, which could substantially slow down the load of this page. Before the page loads, the browser attempts to download the Remote Desktop application, if it is not present on the client already. If this control cannot be downloaded, the user is returned to the main menu and presented with an error message, e.g., "This portion of the Remote User Portal requires the Remote Desktop application. Your browser's security settings may be preventing you from downloading it. Adjust these settings, and try to connect again."

The "Connect as ..." check box is selected by default. If it is selected, the user's credentials are forwarded to the target computer. If it is deselected, the user has to manually enter log-on credentials once the terminal services session is established. The Connect button is grayed out until a client is selected. Of course, other options may be provided at the discretion of the designer.

As the terminal services session is established, a message "Connecting ..." is displayed in the center of the terminal services control. The remote desktop is rendered in the same browser window as the selection screen, if any other than full screen is selected.

The Remote User Portal is exposed to both the VAP and to the end user alike. Besides the usual help and documentation topics, the following Welcome e-mail and Remote User e-mail are implemented. The Remote User Portal is mentioned in the "Welcome to Small Business Server" e-mail sent to all the new users of internal server, if the Server Tools component is installed. There is a brief description and a link to the general description help topic. At the time the Welcome e-mail is sent, it is uncertain whether the site is open to the Internet or what the URL would be. Therefore, the e-mail refers to the site as a potential feature. The user is pointed toward the administrator to find out if the site is available.

The remote user e-mail will be sent to users of the Remote User Portal users security group as they are added to that group. The HTML-formatted e-mail contains some introductory text, a link to the Remote User Portal (if known), a link to set the user's home page, and a general description help topic. The link is determined using the method described hereinbelow with respect to FIG. 10. The text of the e-mail is includes the Sender, Reply-To text, Subject text, e.g., "Remote User Portal is now available", and Body. The Body text may include text like the following, "Your administrator has granted you access to the new Remote User Portal. Using the Remote User Portal, you can reach your internal business server network from almost any computer that has Internet access. You can access your e-mail and calendar, your computer's desktop, and your company's internal Web site. This web site is located at %URL%. Note that this address might be different from any you have previously received. We recommend that you record this address for reference when you are away from your company. Contact your administrator for the Web site address. Note that this address might be different from any you have previously received. For more information, see Information and Answers or click View Remote User Portal Help after opening the Remote User Portal."

Sending the e-mail is disabled if a corresponding registry key is set to zero (or off). There are several places in the UI system where the creation and sending of this e-mail may be triggered. With respect to the Configure E-mail and Internet Connection Wizard (CEICW), when the Remote User Portal's URL changes in the CEICW, the e-mail is sent to all users that exist in the remote users security group. A registry key keeps track of the current state of the Remote Portal for an Add User Wizard and Change User Permissions Wizard. A value of zero signifies that the site is not published, and a value of one signifies that the site is published. If the URL changes and a Sendmail key is set to one, all users in the remote users security group are queried and mail sent to all of them.

With respect to the Add User Wizard, if a user is created and added to the remote users security group and the Sendmail key is set to one, the State registry key is checked to see if the site is open to the Internet. If so, the e-mail is created and sent to that newly added user.

With respect to the Change User Permissions Wizard, if a user is added to the remote users security group and the Sendmail key is set to one, the State registry key is checked to see if the site is open to the Internet. If so, the e-mail is created and sent to that user.

Figure 10:
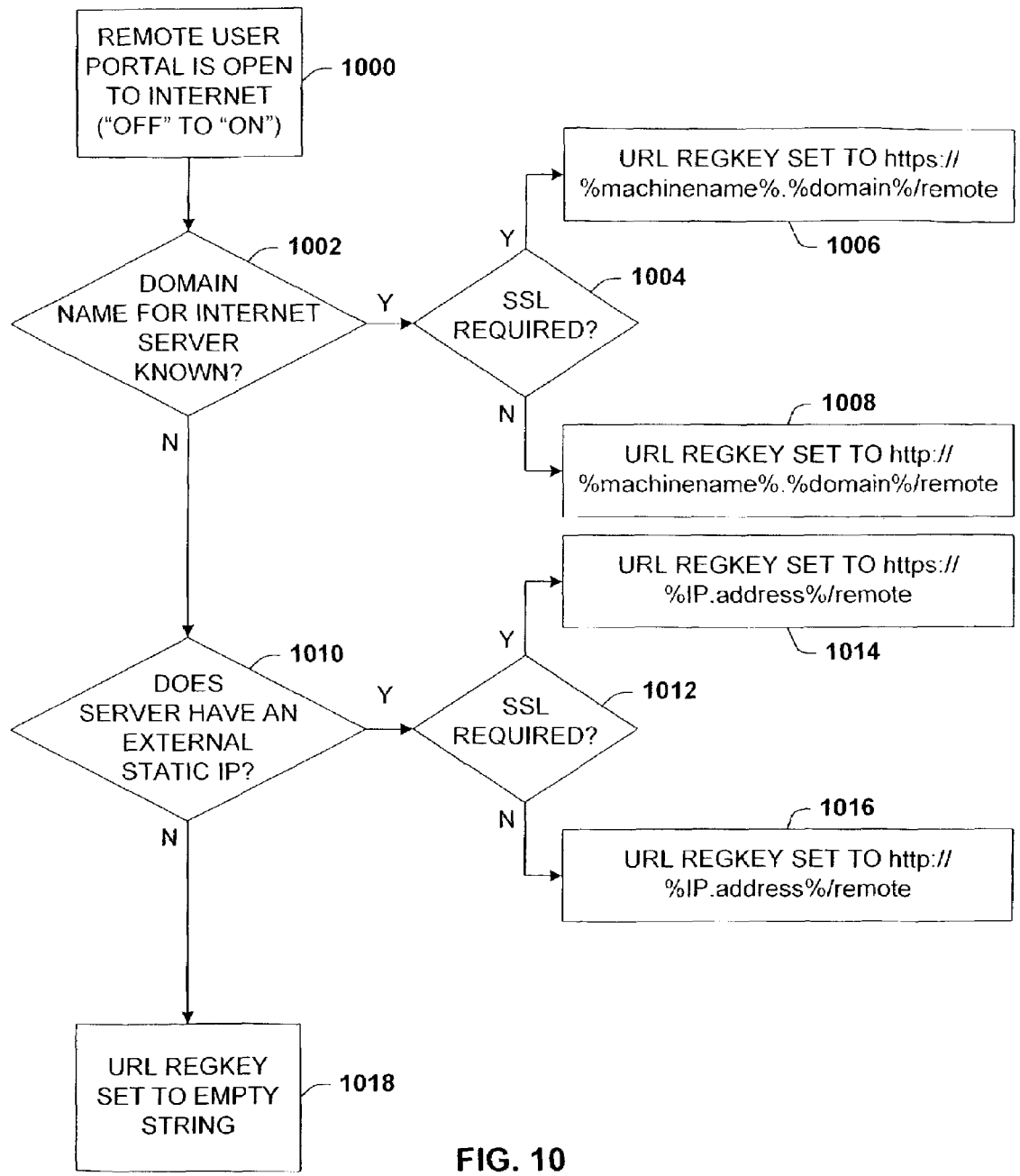
FIG. 10 illustrates a flow chart of the process for determining a URL for insertion into an introductory e-mail.

Referring now to FIG. 10, there is illustrated a flow chart of the process for determining a URL for insertion into an introductory e-mail. One aspect to successfully exposing the Remote User Portal is to provide a link so that the user can easily get to the page and make that page their home page. Since there is no guarantee that the CEICW will be run before users and computers are added, the home page is not set by default, since it may result in are too many pitfalls, e.g., overwriting the user's favorite home page. Rather, the link is provided and a quick and simple way to set it as the home page is offered in the introductory e-mail. When the CEICW is run and the Remote User Portal is published to the Internet, the URL for the Remote User Portal is determined in the manner described below and written to a registry key. This key is updated whenever the CEICW is run and the published state of the Remote User Portal goes from "off" to "on".

Thus at 1000, the published state of the RUP moves from off to on, and the process to determine the URL is as follows. At 1002, the system determines if the domain name for the Internet server is known. If YES, flow is to 1004 to determine if an SSL connection is required. Note however, that an SSL connection is not always required for the web site. If YES, flow is to 1006 to set the URL regkey to "https://". If an SSL connection it is not required, flow is from 1004 to 1008 to set the URL regkey with "http://". If there is a known Internet domain name for the server, the rest of the URL is %machinename%.%domain%/remote (e.g., machinename.mycompany.com/remote). This address is used rather than the simplified address www.mycompany.com, since this method ensures that the URL is presented correctly even if the company has a business card web site hosted at the ISP (Internet Service Provider). In this case, the DNS (Domain Name Server) entry for www.mycompany.com points to the ISPs server, rather than the internal business server. There must be a DNS entry at the ISP for this internal business server address, since the ISP must keep track of the IP address of the internal server, even if that address is dynamic. The "/remote" extension is added so that the link works, even if the user has removed the incoming request filter. Note that users can still use www.mycompany.com/remote, if the DNS entry for mycompany.com points to the internal business server, but using the address described above requires no changes to any existing web site. Further note that some ISPs block access to port 80 on dynamic IP addresses.

If there is no known domain name for the server, flow is from 1002 to 1010 to determine if the server has an external static IP address. If YES, flow is to 1012 to determine if an SSL connection is required. If YES, flow is to 1014 to set the URL regkey to https://%IP.address%/remote. Although this address is not as easy to remember, it still gets the URL out to the users who could then set it as their home page. Again, the "/remote" extension ensures that this works even if the ISAPI filter has been disabled. If NO, flow is from 1012 to 1016 to set the URL regkey to http://%IP.address%/remote.

If there is no known domain name for the server, and it has a dynamic external IP address, flow is form 1010 to 1018, where there is not much that can be done in terms of delivering a static URL. Thus the URL is set to a blank string.

Publishing the Remote User Portal in CEICW prompts an e-mail to be sent to remote users, and enables an e-mail for all future users added to the remote users security group. Furthermore, changes to the URL of the Remote User Portal will also re-send out the e-mail to the remote users security group. Opening up the Remote User Portal will also open port 4125 for use by the terminal services proxy tool. This port is in the registered port numbers group, which can be used by ordinary user processes and programs. Publishing the Remote User Portal also publishes the ClientHelp virtual folder, disabling anonymous access on that folder. This allows the client help documentation to be seen from the Internet via the Remote User Portal. Analogously, un-publishing the Remote User Portal will un-publish the ClientHelp folder. Un-publishing the ClientHelp folder does not un-publish the Remote User Portal.

A User Assistance feature is provided, and includes an Internet Configuration Document for configuring the RUP for interfacing with other web sites. When interfacing to a business card web site on the internal business server, the user will request www.mycompany.com. To access the Remote User Portal, the user requests www.mycompany.com/remote. For a business card web site hosted by an ISP, which is the most common scenario, the business can either use the subweb that links to the internal business server's IP address (e.g., machinename.mycompany.com) or create a page on the web site that redirects the user to the server's IP address (e.g., www.mycompany.com/remote). In the first case, the client's home page can be set to machinename.mycompany.com/remote, and in the second case, the homepage of the remote client will be set to the correct ISP URL or the server's IP address (e.g., %IP.address%/remote).

If no business card website, purchasing an Internet domain name is still important. If the company does not own a domain name or does not supply one in the ICW, the home page of clients is set to the server IP address. If one is supplied, the home page can be set to www.mycompany.com/remote. Inputting the server IP address is problematic for the user.

The site utilizes SSL and a certificate to maintain a secure connection. A certificate can be created within the disclosed architecture, and is recommended, and enabled by default if the RUP is enabled in CEICW.

The RUP site requires that the Internet browser support cookies, and have them enabled. If these criteria are not met, the connection will be refused, and the user is presented with an error message.

Figure 11:
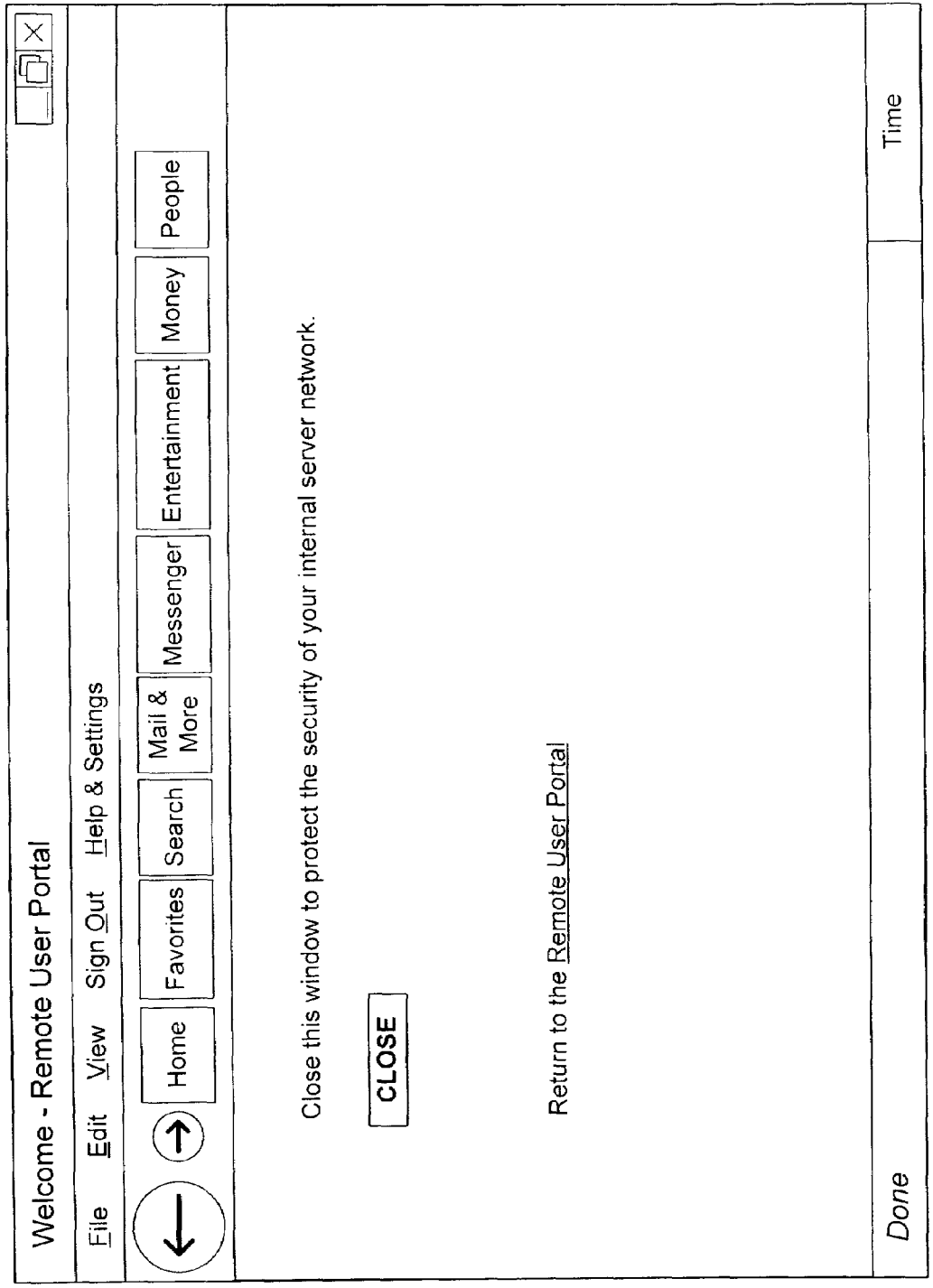
FIG. 11 illustrates a logout web page of the remote user portal.

Referring now to FIG. 11, there is illustrated a logout web page 1100 of the Remote User Portal. The web site supports a logoff feature that prevents future users of the same browser from pressing "Back" and being authenticated to, or seeing pages from, the Remote User Portal. This is important for the kiosk scenario. Pressing logoff revokes the cookie on the server. It "forwards" the logoff request to the e-mail application and terminals services connections, if one is open, and terminates those sessions. The web site then shows a message in the window, e.g., "You have successfully logged off from the Remote User Portal. Close this window to protect the security of your Small Business Server network."

The page 1100 also includes a Close button, and a "Return to the Remote User Portal" link that refers back to the logon page 600.

The Remote User Portal disables a built-in timer, and uses its own specially designed timer. If there is no action from an external user after a set period of time (e.g., ten minutes), the session times out, and the user has to log on again in order to use the site. On an internal business server client machine, the timeout is set to sixty minutes to allow for longer RUP uninterrupted sessions in order to prevent losing established remote desktop connections or e-mail, in progress. One minute before expiration, users are prompted to confirm to continue the session, with a popup "Yes/No" window. This window appears in the foreground of all other windows, and remains up for a predetermined amount of time, e.g., one minute. The notification text may be as follows: "Your Remote User Portal session is about to expire due to inactivity. Do you want to continue using the site?" If the user does not respond after one minute, the popup will disappear and the user will be automatically signed out. If the user selects No, the user will be signed out. If the user selects Yes, the timer is rest to its internal or external limit appropriately. The time out values (in minutes) are configurable in the registry.

An exception to this case is when a user starts any terminal services session in the RUP. In the full screen case, the browser may not interpret activity in the terminal services session as activity in the browser. Consequently, the user may get timeout warnings when working in the terminal services full screen. Therefore, when a user starts a full screen TS session, the RUP timer is stopped, and timing relies instead upon the terminals services built-in timer, which is programmatically set to one minute less than the RUP-specific timer. When the terminal services timer expires, terminal services control immediately pops up the RUP timeout warning described above, which will then gives the user one minute to respond before signing out.

Figure 12:
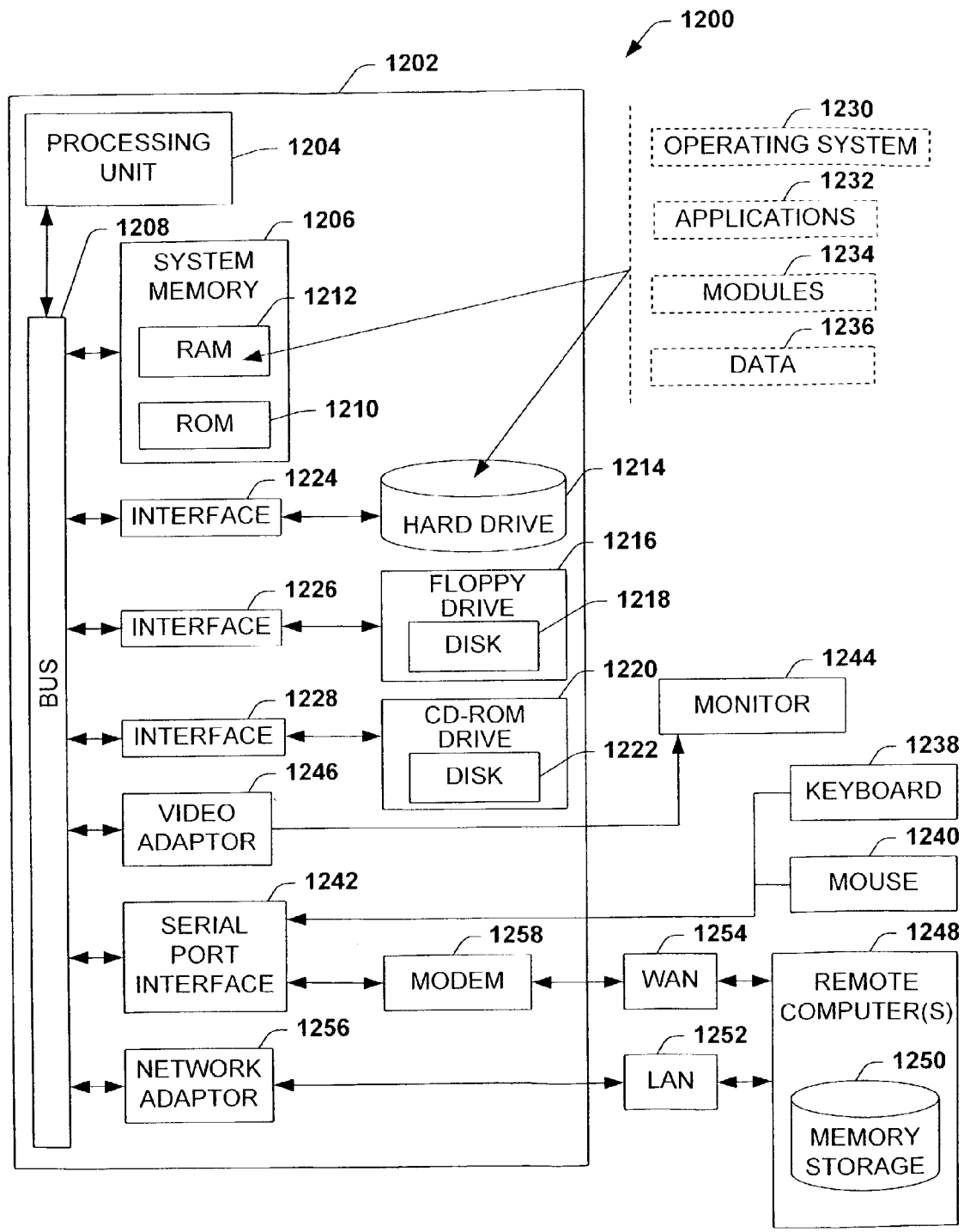
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the present invention, FIG. 12 and the following discussion are intended to provide a brief, general description of a suitable computing environment 1200 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 12, there is illustrated an exemplary environment 1200 for implementing various aspects of the invention includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 may be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a nonvolatile memory 1210 such as ROM, EPROM, EEPROM, which BIOS contains the basic routines that help to transfer information between elements within the computer 1202, such as during start-up.

The computer 1202 further includes a hard disk drive 1214, a magnetic disk drive 1216, (e.g., to read from or write to a removable disk 1218) and an optical disk drive 1220, (e.g., reading a CD-ROM disk 1222 or to read from or write to other high capacity optical media such as Digital Video Disk (DVD)). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The drives and their associated computer-readable media provide nonvolatile storage of data, data structures, computer-executable instructions, and so forth. For the computer 1202, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1212, including an operating system 1230, one or more application programs 1232, other program modules 1234 and program data 1236. It is appreciated that the present invention can be implemented with various commercially available operating systems or combinations of operating systems.

A user can enter commands and information into the computer 1202 through a keyboard 1238 and a pointing device, such as a mouse 1240. Other input devices (not shown) may include a microphone, an IR remote control, a joystick, a game pad, a satellite dish, a scanner, or the like. These and other input devices are often connected to the processing unit 1204 through a serial port interface 1242 that is coupled to the system bus 1208, but may be connected by other interfaces, such as a parallel port, a game port, a universal serial bus ("USB"), an IR interface, etc. A monitor 1244 or other type of display device is also connected to the system bus 1208 via an interface, such as a video adapter 1246. In addition to the monitor 1244, a computer typically includes other peripheral output devices (not shown), such as speakers, printers etc.

The computer 1202 may operate in a networked environment using logical connections via wired and/or wireless communications to one or more remote computers, such as a remote computer(s) 1248. The remote computer(s) 1248 may be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include a local area network (LAN) 1252 and a wide area network (WAN) 1254. Such networking environments are commonplace in offices, enterprise-wide computer networks, intranets and the Internet.

When used in a LAN networking environment, the computer 1202 is connected to the local network 1252 through a wired or wireless communication network interface or adapter 1256. The adaptor 1256 may facilitate wired or wireless communication to the LAN 1252, which may also include a wireless access point disposed thereon for communicating with the wireless adaptor 1256. When used in a WAN networking environment, the computer 1202 typically includes a modem 1258, or is connected to a communications server on the LAN, or has other means for establishing communications over the WAN 1254, such as the Internet. The modem 1258, which may be internal or external and a wired or wireless device, is connected to the system bus 1208 via the serial port interface 1242. In a networked environment, program modules depicted relative to the computer 1202, or portions thereof, may be stored in the remote memory storage device 1250. It will be appreciated that the network connections shown are exemplary and other means of establishing a communications link between the computers may be used.

Figure 13:
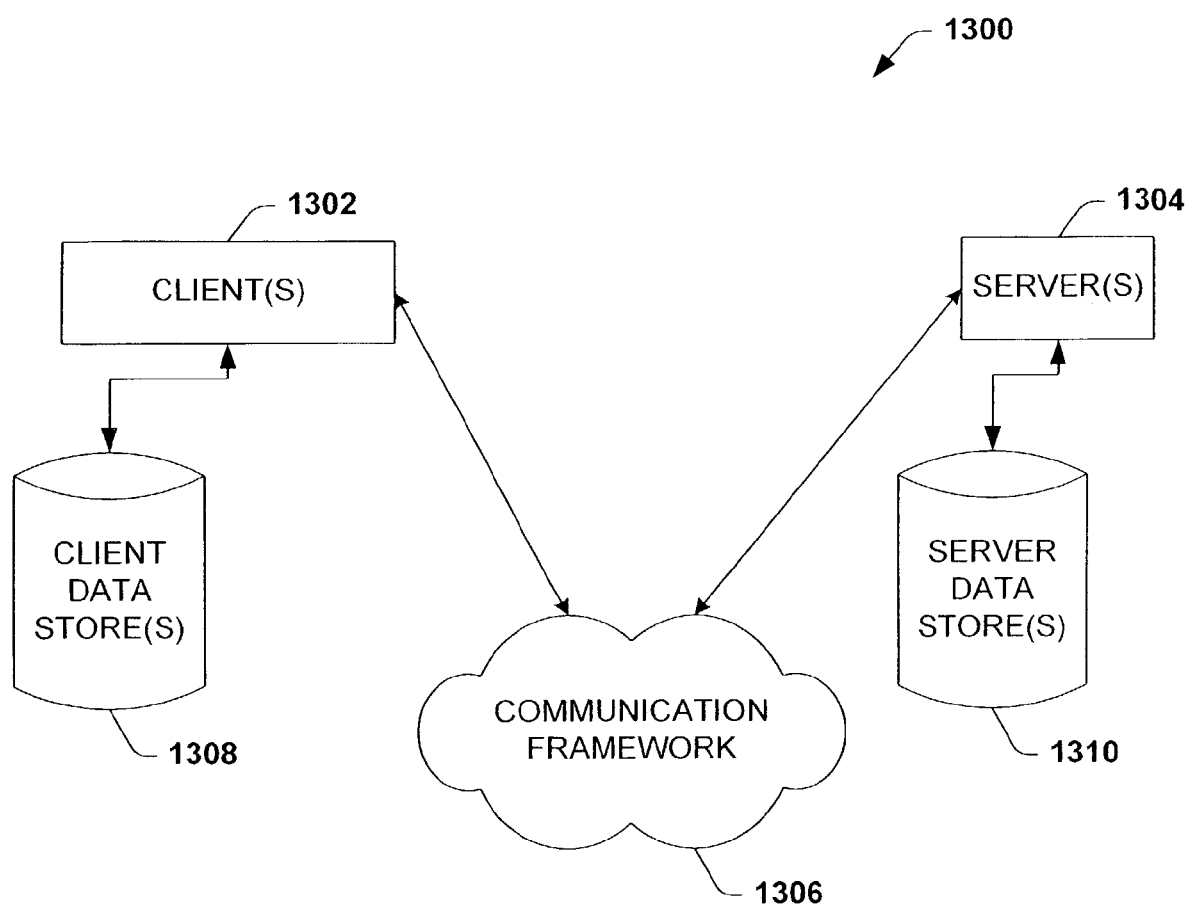
FIG. 13 illustrates a schematic block diagram of an exemplary computing environment in accordance with the present invention.

Referring now to FIG. 13, there is illustrated a schematic block diagram of an exemplary computing environment 1300 in accordance with the present invention. The system 1300 includes one or more client(s) 1302. The client(s) 1302 can be hardware and/or software (e.g., threads, processes, computing devices). The client(s) 1302 can house cookie(s) and/or associated contextual information by employing the present invention, for example. The system 1300 also includes one or more server(s) 1304. The server(s) 1304 can also be hardware and/or software (e.g., threads, processes, computing devices). The servers 1304 can house threads to perform transformations by employing the present invention, for example. One possible communication between a client 1302 and a server 1304 may be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications may be facilitated via a wired (including optical fiber) and/or wireless technology. The client(s) 1302 are operably connected to one or more client data store(s) 1308 that can be employed to store information local to the client(s) 1302 (e.g., cookie(s) and/or associated contextual information). Similarly, the server(s) 1304 are operably connected to one or more server data store(s) 1310 that can be employed to store information local to the servers 1304.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates remotely connecting an external computer outside of at least one of a router or a firewall or a protected intranet to an internal computer that is part of the intranet, the remote connection established directly between the external computer and a router in the intranet, the system comprising:

a request component that receives a request to remotely connect to at least one internal computer that is selected by a user from a dynamically assembled list of available computers that are part of the intranet, wherein the availability of the computers is determined based on both the user's credentials that identify the user and based on a determination that one or more of the operational computers is suitable, wherein suitability for a computer indicates whether the computer has a suitable operating system or remote access capabilities, wherein operational but unsuitable computers are not indicated as being available;

a connection component that, in response to an authentication of the request, creates a thread to manage a network connection between a listening socket port of the router and a port of the at least one selected internal computer designated at least in part for network connections, the connection component opens a single external port to which is mapped one or more internal ports to internal computers and dynamically listens on the ports, the router forwards terminal services data messages between the external computer and the selected internal computer, thereby allowing a terminal services session through the firewall; and a display generating component that sends a dynamically generated menu specific to the user to the external computer, wherein the dynamically generated menu includes links to one or more software applications and other resources that the user is permitted to access, wherein the user, using the menu links, can launch an application from the selected internal computer that is not installed on the external computer.

2. The system of claim 1, the thread forwards an incoming message from the socket port to the computer port.

3. The system of claim 1, the thread forwards an incoming message from the computer port to the socket port.

4. The system of claim 1, the connection being a terminal services connection.

5. The system of claim 1, the connection being a TCP/IP connection.

6. The system of claim 1, the request received from the external computer.

7. The system of claim 1, the connection component is a server disposed on the intranet.

8. The system of claim 1, the connection component passes a port value back to the external computer in the form of a URL.

9. The system of claim 1, the connection component creates the socket port on the internal computer, which socket port is designated for terminal services.

10. The system of claim 1, the connection component reads a port number value of an associated port from a registry and creates a listening socket on that port.

11. The system of claim 10, the port is open in the router and/or firewall.

12. The system of claim 1, the plurality of available computers is available according to predetermined criteria.

13. The system of claim 1, the external computer presents the list of the plurality of available computers for connection thereto.

14. The system of claim 1, the external computer is disposed on a global communication network.

15. The system of claim 1, the external computer connection is automatically routed to a remote user portal computer upon selection of an option presented by the connection component, which is an intranet server.

16. The system of claim 15, the remote user portal is disposed external to the intranet on a global communication network.

17. The system of claim 15, the remote user portal is a dynamically created website based upon external client information.

18. The system of claim 17, the external client information including at least one of user login rights, configuration of the user's external computer, applications installed on the external computer, and authentication of the user.

19. The system of claim 1, the connection component performs authentication of the external computer.

20. The system of claim 1, the external computer is prompted to install compatible software before accessing the plurality of available computers.

21. The system of claim 1, the intranet server facilitating secure socket layer according to a virtual root.

22. The system of claim 1 the connection component forwards the request, which is a terminal services request, through the router and/or firewall.

23. The system of claim 1, a user of the external computer is granted access to a remote user portal computer only if the user is a member of a predetermined group.

24. A network according to claim 1.

25. A system that facilitates remotely connecting an external client outside of an intranet to an internal client that is part of the intranet, the remote connection established directly between the external client and a intranet server, the system comprising:

the intranet server behind a firewall that receives a remote desktop request to remotely connect to the internal client based in part on a selection by a user from a dynamically assembled list of available internal clients that are part of the intranet, wherein the availability of the internal clients is determined based on both the user's credentials that identify the user and based on a determination that one or more of the operational internal clients is suitable, wherein suitability for an internal client indicates whether the internal client has a suitable operating system or remote access capabilities, wherein operational but unsuitable internal clients are not indicated as being available wherein the intranet server creates a thread to manage a network connection between a listening socket port of the intranet server and an internal socket port of the internal client such that a single external port is mapped to one or more internal ports to internal clients, the listening socket port and the internal socket port arc dynamically opened and closed, the intranet server forwards terminal services data messages between the external client and internal client thereby allowing a terminal services session through the firewall and sends a dynamically generated menu specific to the user to the external client, wherein the dynamically generated menu includes links to one or more software applications and other resources that the user is permitted to access, wherein the user, using the menu links, can launch an application from the selected internal client that is not installed on the external client.

26. The system of claim 25, the thread listens for traffic from both the external client and the internal client, and forwards the traffic between the listening port and the internal port.

27. The system of claim 25, the network connection is based upon a TCP/IP protocol.

28. The system of claim 25, the intranet server generates a list of available clients on the intranet from which the internal client is selected.

29. The system of claim 25, the intranet server passing a value for the listening port to the external client in the form of a URL, in response to the thread being started.

30. The system of claim 25, the external client receives a value for the listening port from the intranet server in the form of a URL.

31. The system of claim 25, the intranet server creates a socket on the internal client that is designated for the remote desktop connection.

32. The system of claim 25, further including a single external port that maps to multiple ports of a plurality of the internal clients.

33. The system of claim 25, the remote desktop connection includes at least one of a terminal services connection, and an X-Windows connection.

34. A method of remotely connecting an external computer to one or more internal computers that are part of an intranet, a terminal services connection established directly between the external computer and a router in the intranet, the method comprising:

receiving a request to remotely connect to the intranet;

receiving a selection by a user to connect to at least one of a plurality of available internal computers that are part of the intranet, wherein the availability of the computers is determined based on both the user's credentials that identify the user and based on a determination that one or more of the operational computers is suitable, wherein suitability for a computer indicates whether the computer has a suitable operating system or remote access capabilities, wherein operational but unsuitable computers are not indicated as being available;

creating a listening socket on a port on an intranet server, the same port is already opened in a firewall associated with the intranet;

processing the request through at least one of a router or the firewall interstitial to the external computer and the one or more internal computers, the router or firewall employing terminal services;

providing a single access point to access relevant features of the intranet accessed from outside the firewall or router;

in response to an authentication of the request, creating a thread to manage a terminal services network connection between the listening socket port and one or more internal ports of the one or more internal computers designated at least in part for network connection such that a single external port is mapped to one or more internal ports to the one or more internal computers, the listening socket port and the one or more internal ports dynamically opened and closed;

passing the listening socket port number to the external computer in the form of a URL (uniform resource locator), the URL determined dynamically based in part on at least one of a domain name, SSL (Secure Sockets Layer) connection requirements, external static IP (internet protocol) address or dynamic external IP address, of an internet server;

sending a dynamically generated menu specific to the user to the external computer, wherein the dynamically generated menu includes links to one or more software applications and other resources that the user is permitted to access, wherein the user, using the menu links, can launch an application from the selected internal computer that is not installed on the external computer; and receiving terminal services data from the external computer at the listening socket port; the terminal services data forwarded to the one or more internal computers transparently to a user of the external computer, thereby allowing a terminal services session through the firewall.

35. The method of claim 34, further comprising dynamically opening and closing the listening port and the internal port using the thread.

36. The method of claim 34, further comprising forwarding traffic between the listening port and the internal port using the thread.

37. The method of claim 34, the network connection is based upon a TCP/IP protocol.

38. The method of claim 34, further comprising,
generating a list of available computers on the intranet from which the internal computer is selected; and
presenting the list to a user of the external computer.

39. The method of claim 34, further comprising, starting the thread;
passing a value for the listening port to the external computer in the form of a URL; and opening a port in the external computer when the URL is received thereby.

40. The method of claim 34, the request received from at least one of the external computer and intranet server that forwards the request thereto.

41. The method of claim 34, further comprising opening a same port on the router and/or firewall as the listening port.

42. The method of claim 34, further comprising automatically routing the external computer to an external remote user portal computer that is disposed on a global communication network and is a dynamically created website based upon a configuration of the external computer.

43. The method of claim 34, the authentication performed by an intranet server prior to routing the external computer to a remote user portal.

44. A system that facilitates remotely connecting an external computer to an internal computer that is part of the an intranet, the system comprising:

means for receiving a request to remotely connect to the intranet;

means for receiving a selection by a user to connect to at least one of a plurality of available internal computers that are part of the intranet, wherein the availability of the computers is determined based on both the user's credentials that identify the user and based on a determination that one or more of the operational computers is suitable, wherein suitability for a computer indicates whether the computer has a suitable operating system or remote access capabilities, wherein operational but unsuitable computers are not indicated as being available;

means for processing the request directly through a firewall interstitial to the external computer and the internal computer;

means for creating a thread to manage a network connection between a listening socket port and an internal port of the internal computer designated at least in part for network connection;

means for forwarding terminal services data messages between the external computer and the selected internal computer via a router, thereby allowing a terminal services session through the firewall means for opening a single external port and mapping the single external port to one or more internal ports of internal computers;

means for dynamically opening and closing the listening port and the internal port;

means for sending a dynamically generated menu specific to the user to the external computer, wherein the dynamically generated menu includes links to one or more software applications and other resources that the user is permitted to access, wherein the user, using the menu links, can launch an application from the selected internal computer that is not installed on the external computer.

\* \* \* \* \*